United States Patent [19]

Miyakawa et al.

[11] Patent Number: 5,013,906

[45] Date of Patent: May 7, 1991

[54] FISH SEX DISCRIMINATION EQUIPMENT AND METHOD

[75] Inventors: Tatsuo Miyakawa, Kawasaki; Osamu Kato, Inagi; Yusuke Koike, Tokyo; Keisuke Matsunami, Yokohama; Naoyuki Sekiya, Kawasaki, all of Japan

[73] Assignee: Fujitsu Automation Limited, Kawasaki, Japan

[21] Appl. No.: 403,471

[22] Filed: Sep. 6, 1989

[30] Foreign Application Priority Data

Sep. 13, 1988 [JP] Japan .................. 63-229493

[51] Int. Cl.[5] ............................................. G01N 9/04
[52] U.S. Cl. ................... 250/223 R; 209/588
[58] Field of Search ................... 250/223 R; 209/587, 209/588, 912

[56] References Cited

U.S. PATENT DOCUMENTS 3,859,522  1/1975  Cuthbert .................. 250/223 R
4,051,952  10/1977  Hauptmann et al. ........ 209/588
4,244,475  1/1981  Green ..................... 209/588

Primary Examiner—David C. Nelms
Attorney, Agent, or Firm—Staas & Halsey

[57] ABSTRACT

Fish sex discrimination equipment and method comprising an automatic supplying unit, a light projection and reception detection unit, a discrimination control unit, a discharge unit, and a first conveyor and a second conveyor, and also comprising the steps of automatically supplying fish to be discriminated, transmitting light to a genital gland area of the fish, scanning the light, discriminating the sex of the fish based on the quantity of light trammsitted, for example, a mean value or integrated value, and discharging the fish through the first or second conveyor which corresponds to the sex of the fish.

11 Claims, 15 Drawing Sheets

FISH SEX DISCRIMINATION EQUIPMENT AND METHOD

BACKGROUND OF THE INVENTION (1) Field of the Invention

The present invention relates to fish sex discrimination equipment and method, and more particularly relates to equipment and a method by which fish sex can be discriminated at high speed and with high accuracy utilizing a difference in degree of a transmission of light emitted between the fish roe of a female fish and the milt of a male fish.

(2) Description of the Related Art

Recently, in Japan, herring roe is of great value as "Kazunoko", however, male fish are of little value. Accordingly, to obtain the herring roe from the female fish, it is preferable that the female fish be separated from the male fish so that the roe can be easily obtained, and the time for working and processing can be reduced. In addition, in European countries people eat male herring pickled in vinegar. Therefore, for this purpose it is efficient that the male and female herrings be separated with only the male herrings being processed.

As a result, completely automatic fish sex discrimination equipment which can discriminate the fish sex at high speed and with high accuracy is desired.

An example of conventional fish sex discrimination equipment is disclosed in Japanese Unexamined Patent Publication (Kokai) No. 51-100495 entitled "Nondestructive Sex Discrimination Method of Fish and Equipment Thereof".

The equipment comprises sex discrimination equipment providing a control unit, a detection unit including a light reception portion, and a light source including a light emitting portion; a hopper in which fish to be discriminated are put, a flusher by which the fish are washed, a duct through which the fish are guided to the sex discrimination equipment, and a sorting unit for separating the male and female fish.

In this equipment, the discrimination of fish utilizes a difference of transmission degree for light energy emitted from female roe and male milt.

In the method and the equipment disclosed in Japanese Unexamined Patent Publication (Kokai) No. 51-100495, or U.S. Pat. No. 3,859,522, entitled "Method for Nondestructive Testing of Fish for Sex", the light energy is illuminated onto a genital gland area of the fish to be discriminated, and if the transmission energy is large, the fish is determined to be a female. That is, a light spot is illuminated on the center of the genital gland area, and the quantity of light transmitted is measured and the discrimination of whether the fish is male or female is carried out.

However, if the light spot is not correctly illuminated on the center of the genital gland area, the thickness of the roe or milt decreases, the light transmission quantity changes, and a stable discrimination cannot be obtained. Particularly, since the genital gland area is narrow in the belly to back direction, if the light spot moves off in the belly to back direction, the stability is considerably reduced.

Accordingly, there arises a problem that the light spot must be set accurately in the center of the genital gland area of the fish so as to obtain a stable discrimination result.

Further, in manual supply type equipment, the fish to be discriminated are trued up on the bucket at the head, tail, back and belly thereof by hand, and put on the bucket to coincide a light transmission hole with the center of the genital gland area, then the fishes are supplied to the sex discrimination equipment.

A spot of light is projected from a light projection unit onto the genital gland of the fish to be discriminated, the spot light arrives at a light reception unit, and whether the fish is male or female is discriminated, when the fish is between the light reception unit and the light projection unit, and when the light transmission hole of a bucket on a bucket conveyor is just above the light projection portion. In this case, information used for the discrimination is spot information depending on the area of the light transmission hole.

To reduce the amount of manual labor, instead of supplying the fish on the bucket manually, the separation of the fish automatically one by one and arrangement in the direction head to tail and back to belly using a machine can be considered, however, the complete arrangement in the directions head to tail and belly to back is difficult, and even though the amount of manual labor is reduced, the discrimination rate sometimes also reduces.

Accordingly, if the fish sex discrimination equipment or method disclosed in Japanese Unexamined Patent Publication (Kokai) No. 51-100495 or U.S. Pat. No. 3,859,522 is utilized, it is necessary that the fish be arranged on the bucket of the bucket conveyor by manual trueing in the direction from head to tail and belly to back, and that the fish be supplied to fit the hole for the light transmission to the center of the genital gland area of the fish to coincide the light spot position with the center of the genital gland area.

For the above reasons, five workers are needed to supply fish at a rate of 300/min. Thus, a first problem in which the reduction of workers is prevented arises. Also, a second problem arises in which the positioning between the hole for the light transmission and the genital gland area is not accurate when done manually, and the discrimination rate reduces.

Further, by using the conventional equipment or method, the light spot being information forming a point must be illuminated on the center of the genital gland area so accuracy in positioning is needed. The accuracy in positioning is somewhat satisfied by manually placing the fish to be discriminated on the predetermined position of the bucket, however, the amount of work for the sex discrimination operation cannot be reduced. This is a third problem. While, for the work quantity reduction, the fish can be trued on a predetermined position by using the automatic supply unit, a completely reliable arrangement is difficult. Thus a fourth problem arises in which the discrimination rate is decreased compared with the manual handling. The present invention was created in consideration of these conventional problems.

SUMMARY OF THE INVENTION

An object of the present invention is to provide fish sex discrimination equipment and method wherein instead of fish being supplied by manual labor, or sex discrimination using spot information, the fish supply is automated, the discrimination processes are made to be efficient, and a high accuracy sex discrimination is possible.

According to a first aspect of the present invention, there is provided sex discrimination equipment comprising an automatic supply unit for separating and supplying fish to be discriminated, buckets for putting the fishes, a bucket conveyor for carrying the buckets, a light projection and reception detection means for projecting light to a genital gland area of the fish and for detecting the transmission light which is scanned in a direction of belly to back (from belly to back or from back to belly) at a genital gland area of the fish by the moving bucket, a discrimination control means for discriminating the sex of the fish by the detected transmission light data, a discharge means for discharging fish having a particular sex, a first conveyor means for carrying fish having the same sex, and a second conveyor for carrying fish having the other sex; and the equipment is supplied with fish to be discriminated automatically and discriminates and separates the fish into the respective sexes.

According to a second aspect of the present invention there is provided a sex discrimination method comprising steps of automatically supplying fish to be discriminated, transmitting light to a genital gland area of the fish, scanning the light in a direction of belly to back (from belly to back or from back to belly) by movement of a bucket conveyor, discriminating the fish to be a female when light transmission quantity is large, and discharging the fish having one particular sex in accordance with the discrimination.

By using the equipment of the present invention, the fish to be discriminated are put head first or tail first on the bucket of the bucket conveyor through the automatic supply unit, the scanning light in the direction from belly to back or from back to belly of the fish is illuminated onto the genital gland area of the fish by the light projection and reception detection means, the sex of the fishes are discriminated by the data obtained by light transmission through the fish, and, for example, the male fish are discharged from the fish to be discriminated by the above discrimination, and thus the separation of the male and female fish can be carried out.

Other features and advantages of the present invention will be apparent from the following description given with reference to the accompanying drawings.

DESCRIPTION OF THE PREFERRED EMBODIMENTS

Prior to describing the preferred embodiments, conventional arts will be explained with reference to FIG. 1 to FIG. 4.

Figure 1:
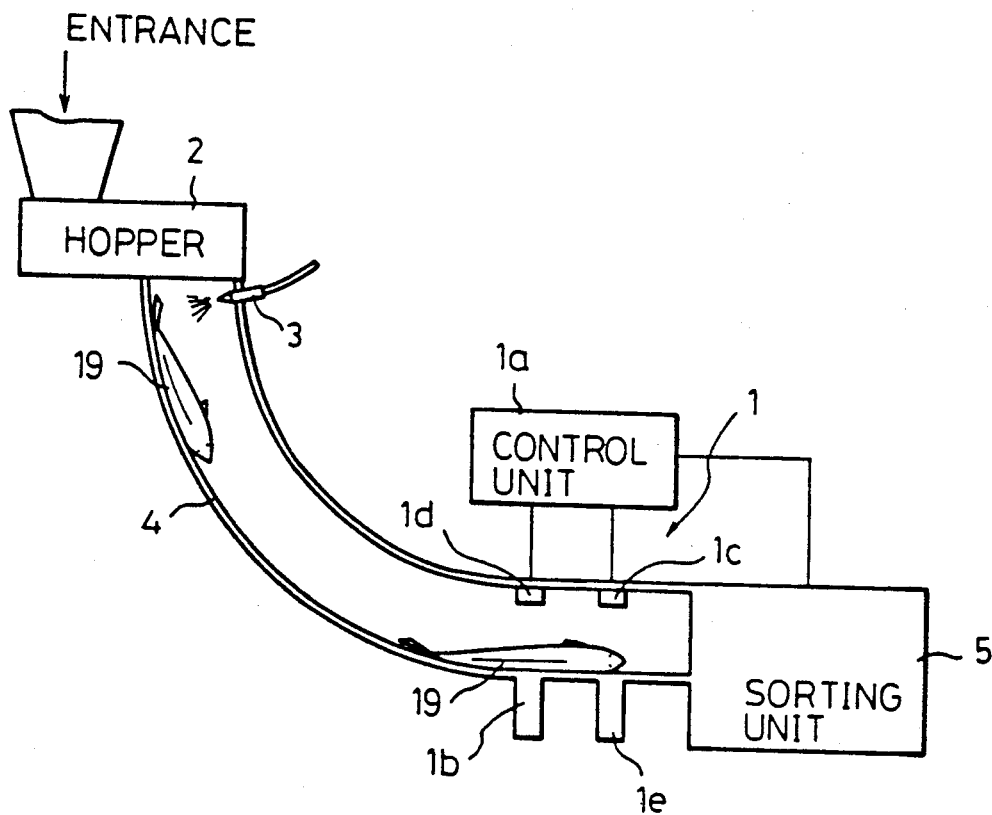
FIG. 1 is an explanatory diagram of conventional fish sex discrimination equipment.

FIG. 1 shows equipment disclosed in Japanese Unexamined Patent Publication (Kokai) No. 51-100495.

In FIG. 1, the equipment comprises a sex discriminator 1 including a control unit 1a, light detectors 1d and 1c, light sources 1b and 1e, a hopper 2 into which fish 19 to be discriminated are put, a flusher 3 for washing the fish, a duct 4 for guiding the fish 19 to the sex discriminator 1, and a sorting unit 5 for sorting the male and female fish.

Figure 2:
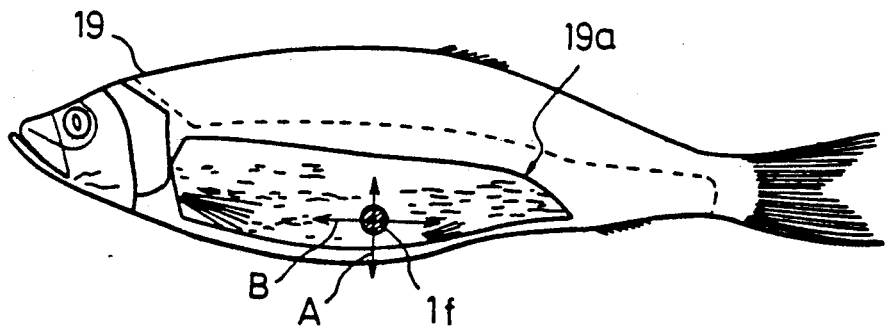
FIG. 2 is a side view of a fish for explaining a conventional fish sex discrimination method.

FIG. 2 shows a side view of the fish 19 for explaining the conventional sex discrimination method. In the figure, the fish 19 to be discriminated is a herring, a cod or the like. 19a shows a genital gland area in a female which is observed during the discrimination, and 1f shows a light spot projected from the light source 1e or 1b.

In the method or equipment disclosed in Japanese Unexamined Patent Publication No. 51-100495 or U.S. Patent No. 3,859,522, light energy is illuminated onto the genital gland area 19a of the fish 19 and if the transmission energy is large, the sex is determined to be female. Namely, as shown in FIG. 2, the light spot 1f is illuminated onto the center of the genital gland area 19a, the light transmission quantity is measured, and whether the fish is male or female is discriminated.

However, if the light spot 1f moves off from the center of the genital gland area, the thickness of the roe or milt decreases, the light transmission quantity changes, and stable discrimination cannot be obtained. Particularly, since the genital gland area 19a is narrow in the direction A from belly to back, if the light spot 1f is off in the direction A, the discrimination stability is considerably lost.

Accordingly, to obtain a stable discrimination result, there arises a problem that the light spot must be set accurately onto the center position of the genital gland area 19a of the fish.

Figure 3:
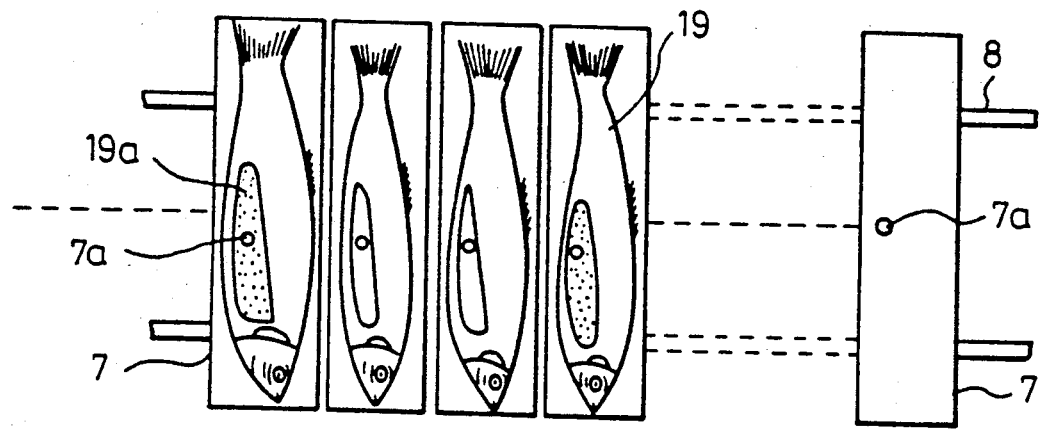
FIG. 3 is a partial view of a conventional manual supply type fish sex discrimination equipment.
Figure 4:
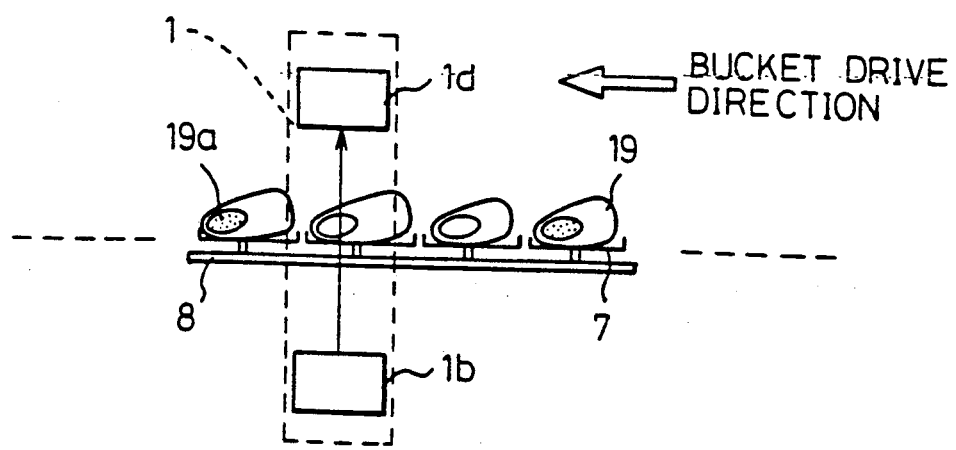
FIG. 4 is a partial sectional view of the equipment of FIG. 3.

In FIG. 3 and FIG. 4, conventional manual supply type sex discrimination equipment is explained. FIG. 3 shows a state of the fish placed on buckets.

Figure 8:
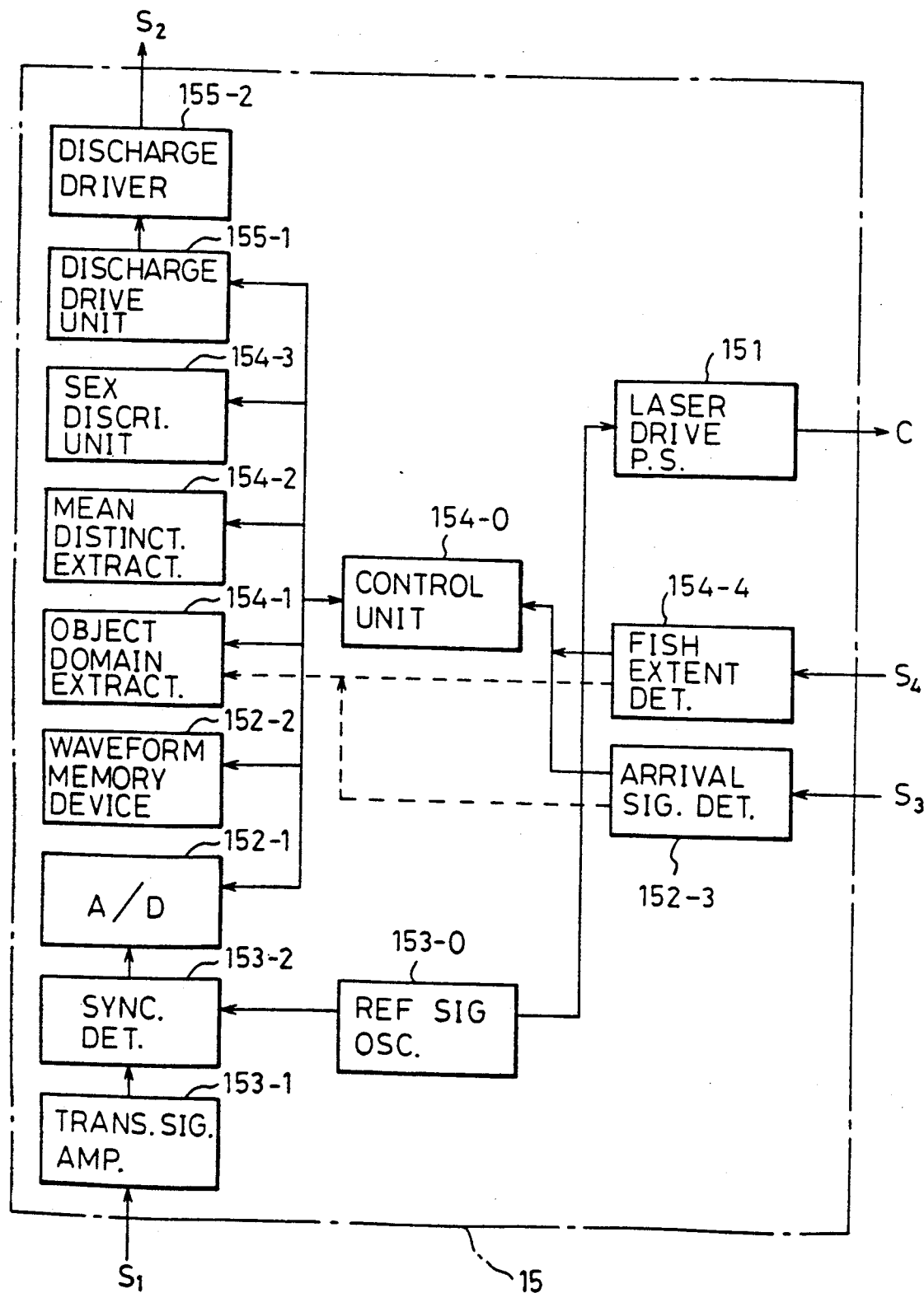
FIG. 8 is a block diagram of a discrimination and control unit in FIG. 7.

In FIG. 3 and FIG. 4, 8 is a bucket conveyor for guiding the fish 19 to the sex discrimination equipment, 7 is a bucket on which a fish 19 is put, and 7a is a light transmission hole for introducing the transmission light forming the light spot f to the light reception unit.

In this method, the fish 19 are aligned at head or tail and aligned equally in the direction from belly to back on the bucket 7 by a manual operation, so that the light transmission hole is aligned with the center of the genital gland area 19a, and the fish 19 are supplied to the sex discriminator 1.

FIG. 4 shows a sectional view of the fishes 19 placed on the bucket conveyor 8 used in the sex discriminator 1.

In FIG. 4, when the fish 19 is between the light reception unit 1d and light projection unit 1b in the sex discriminator 1, and the light beam from the light projection unit 1b to the light reception unit 1d coincides with the light transmission hole 7a in the bucket 7 on the bucket conveyor 8, the light spot 1f is projected from the light projection unit 1b, passes through the genital gland area 19a of the fish 19, and arrives at the light reception unit 1d, and the determination of whether the fish is male or female is carried out based on the reception signal. The information to be discriminated is spot information depending on an area of the light transmission hole 7a.

Further, to realize a reduction in manual labor, instead of supplying the fish on the bucket 7 by a manual operation, the introduction of a machine which can automatically separate fish one by one and align them in the direction A from head to tail and in the direction B from belly to back, can be considered. However, the complete alignment of head or tail and the complete arrangement in the direction from belly to back is difficult, so as a result, instead of the reduction of processing time, sometimes the discrimination rate decreases.

Figure 5:
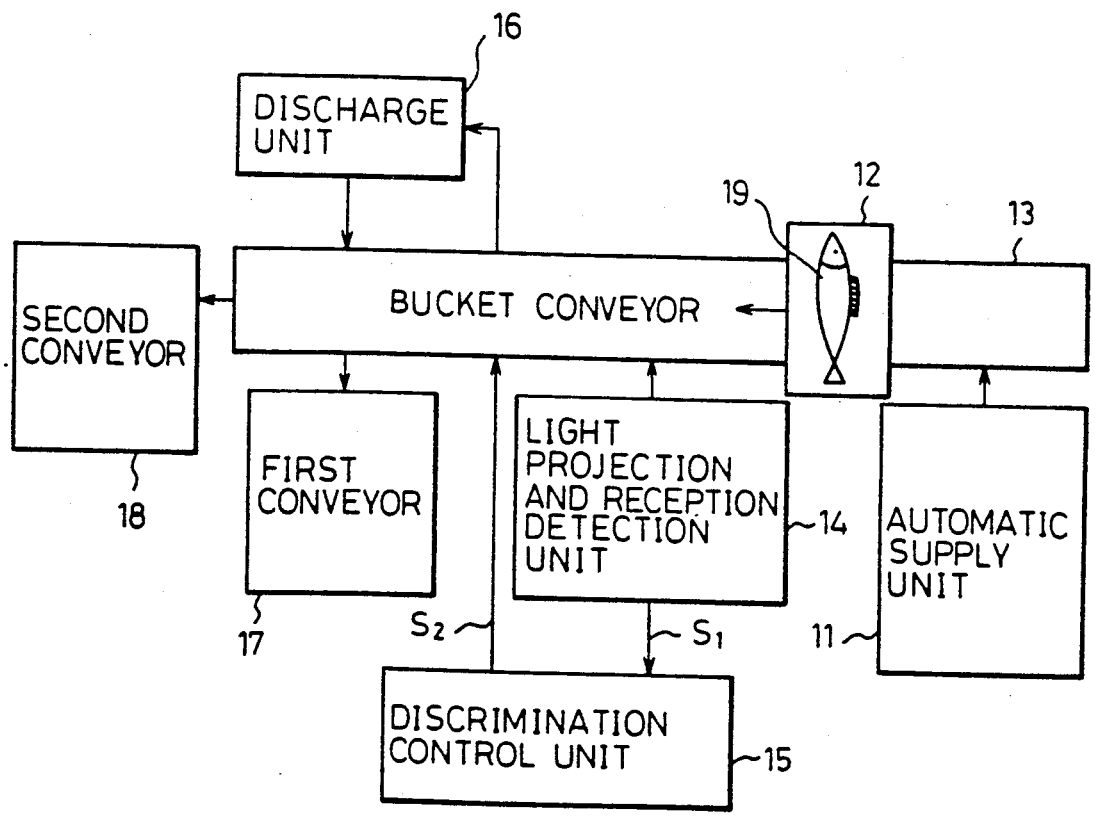
FIG. 5 is a summarized block diagram of the fish sex discrimination equipment for explaining the present invention.

Fish sex discrimination equipment according to the present invention is next explained with reference to FIG. 5.

The equipment comprises an automatic supply unit 11 for separating and supplying fish 19 to be discriminated, buckets 12 on which the fish 19 are put, a bucket conveyor 13 for carrying the buckets 12, a light projection and reception detection means 14 for detecting transmission light scanned in a direction from belly to back or back to belly in a genital gland area of the fish 19, a discrimination control means 15 for discriminating the sex of the fish 19 based on the detected transmission light data, a discharge means 16 for discharging the fish having the same sex, a first conveyor 17 for carrying the fish having the same sex, and a second conveyor 18 for carrying the fish having the opposite sex; and automatically supplying the fish 19 and discriminating whether the fish 19 are male or female.

A fish sex discrimination method according to the present invention comprises the steps of automatically supplying fish 19 to be discriminated, transmitting light scanned in a direction from belly to back in a genital gland area 19a of the fish 19, discriminating female fish based on the light data when the transmission light is strong, and separately discharging the fish having the same sex based on the discrimination data.

Next, embodiments of the present invention are explained with reference to FIG. 6 to FIG. 20. A first embodiment is shown in FIG. 6 to FIG. 18.

Figure 6:
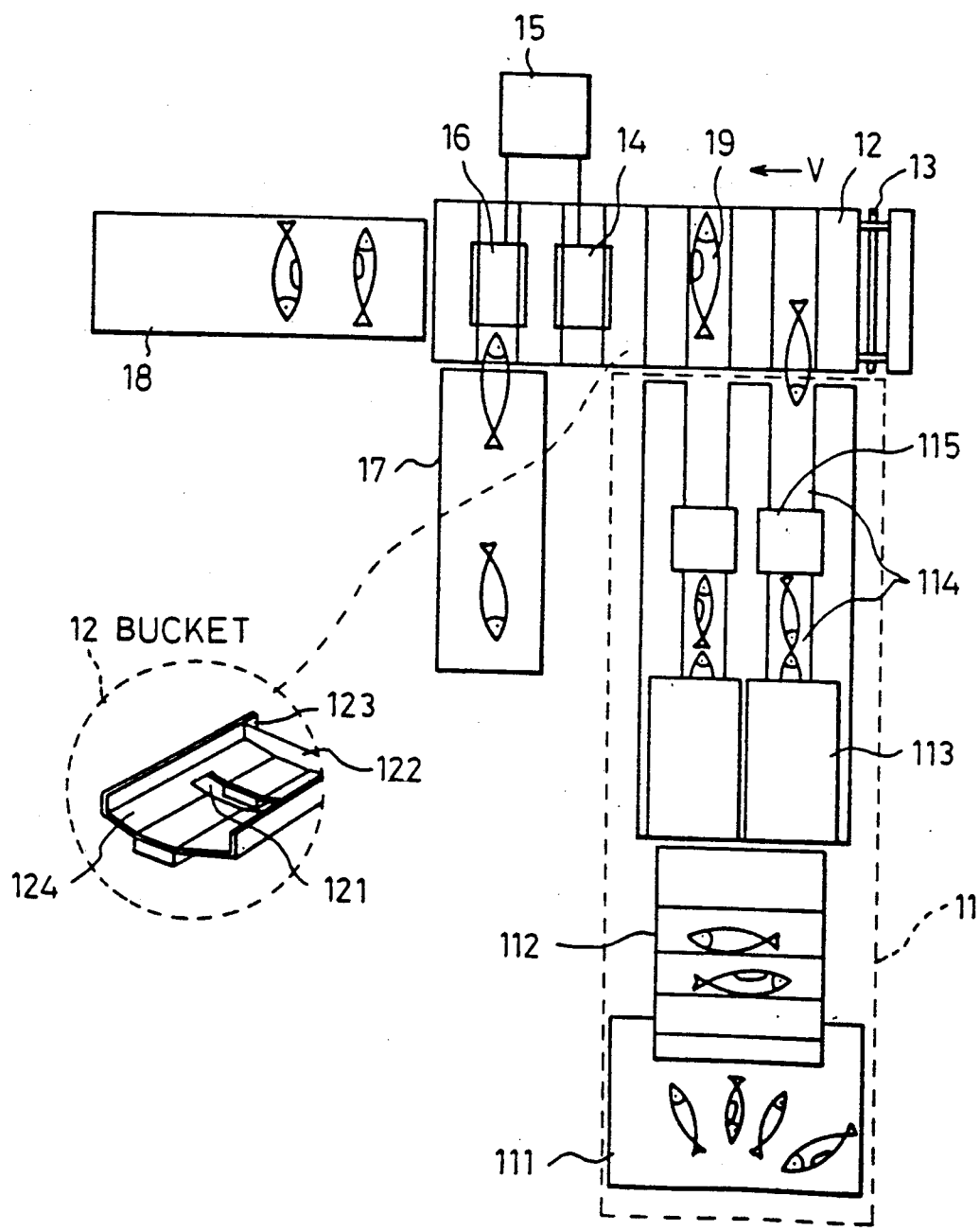
FIG. 6 is an explanatory diagram of fish sex discrimination equipment according to a first embodiment of the present invention.
Figure 7:
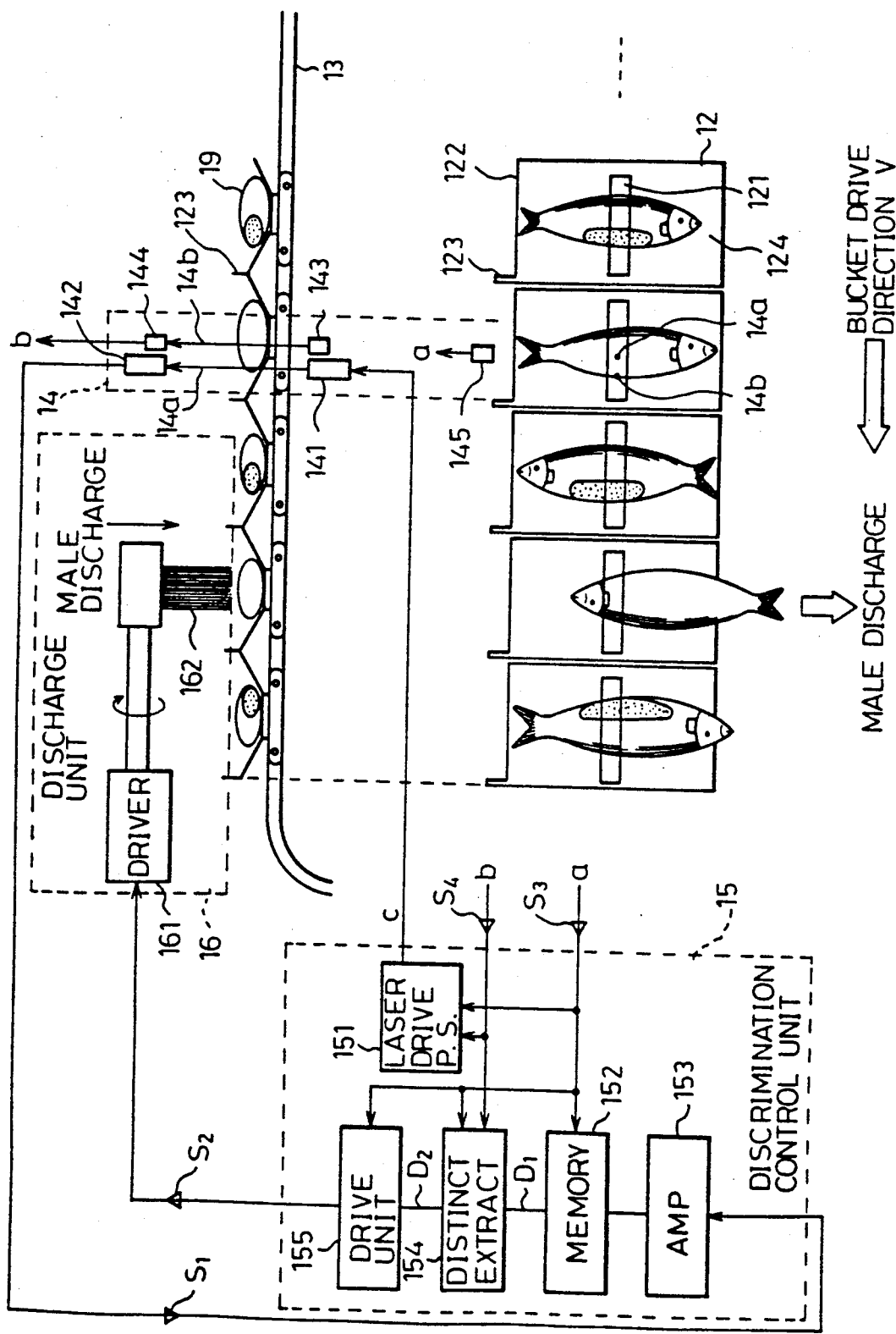
FIG. 7 is a partial detailed diagram of the equipment of FIG. 6.

In FIG. 6, the summarized plan view of the first embodiment is shown, and FIG. 7 is a diagram for explaining a light sensor unit 14 (reception detection unit), a discrimination control unit 15, and a discharge unit 16.

In FIG. 6, 11 is an automatic supply unit for separating and supplying fish 19 to be discriminated to buckets 12. The automatic supply unit 11 comprises a hopper 111 into which the fish are thrown together, a charge conveyor 112 for picking up the fish 19 in the hopper 111 and supplying the fish 19 to an arranging portion 113 in a direction from head to tail, the arranging portion 113 for arranging the fishes 19 head first or tail first and advancing in the arranged direction, fish guide paths 114 for advancing the fish one by one in the direction from head to tail, and a separation and supply portion 115 for sending a continuous line of fish 19 to the bucket 12 on the bucket conveyor 13 one by one at regular intervals separating them alternately between two exits.

Thus, the fish 19 are arranged head first or tail first by the arranging portion 113 in the direction of head to tail so that the fish 19, can, for example, be automatically supplied one by one to the bucket 12 by the separation and supply portion 115 synchronized with the moving speed of the bucket conveyor 13.

As a result, manual labor is not necessary so that automation is possible.

The bucket 12 where the fish 19 are placed, as shown in the broken line circle, comprises a light transmission slit 121, a guide plate 122, a projection 123 for detecting a bucket arrival, and a base plate 124 on which the fish is supported.

As mentioned above, by putting the fish 19 on the bucket 12, light 14a from a light projection unit 141 of the light projection and reception detection unit 14 can be supplied to a light reception unit 142 after passing through the fish 19 via the elongated light transmission slit 121 provided in the bucket 12, while the bucket conveyor 13 is moving.

In these ways, the fish 19 can be automatically positioned in relation to the light projection and reception detection unit 14, and the light transmission signal $S_1$ becomes linear information depending on the width of the light transmission slit.

The bucket conveyor 13 carries the buckets 12 synchronized with the fish supply time of the separation and supply portion 115 to the light projection and reception detection unit 14.

The light projection and reception detection means utilizes a light sensor 14 in this embodiment and detects the transmission light through the genital gland area 19a of the fish 19. The light sensor unit 14, as shown in FIG. 7, comprises a projection unit 141 for projecting modulated light from a semiconductor laser or the like not including external light, a light reception unit 142 including a semiconductor light reception element or the like, photoelectric switches 143 and 144 for controlling light projection time, and a proximity switch 145.

The discrimination control unit 15 is for discriminating the sex of the fish 19. The discrimination control unit 15 of this embodiment, as shown in FIG. 7, comprises a light projection power source (laser drive power source) 151 providing infrared light having a wave length of approximately 830 Å A or a laser light, a waveform memory 152 for storing transmission light waveform data which is level adjusted and analog to digital (A/D) converted to provide a light transmission signal $S_1$, an amplifier 153 for amplifying the fine light transmission signal $S_1$ detected from the light reception unit 142 to the necessary voltage level for the waveform memory, a distinction extraction and discrimination unit 154 for extracting and discriminating necessary distinction information for determining the sex of the fish by domain information from the transmission light waveform data stored in the waveform memory 152 and photoelectric switch signal $S_4$ or the proximity switch 145, and a discharge drive unit 155 for outputting a drive control signal $S_2$ based on the male or female discrimination data determined by whether the distinctive quantity is large or small.

By using the above constitutions, the light transmission signal $S_1$ obtained by applying the light projection and reception means 14 to the fish is stored in the waveform memory 152 as a light transmission quantity I in response to the position in the belly to back direction A of the fish 19, the stored data is analyzed for the waveform area through the distinction extraction and discrimination unit 154, and if the light transmission quantity I is large, the fish is determined to be female, and if the light transmission quantity I is small, the fish is determined to be male. The drive control signal $S_2$ can then be output to control the discharge means 16 based on the above determinations.

Thus, in comparison with the discrimination based on the spot information by the conventional light spot, the discrimination based on the light transmission quantity I obtained from the linear information of the light transmission signal $S_1$ is possible, and therefore, a highly accurate discrimination of fish sex can be achieved.

The discharge means is a discharge unit 16 which discharges, for example, male fish. As shown in FIG. 7, the discharge unit 16 comprises a drive unit 161 for a motor or the like, and a brush 162 for brushing the fish.

The first conveyor 17 is a conveyor carrying male fish and the second conveyor 18 is a conveyor carrying female fishes. V shows the direction of movement of the bucket conveyor 13.

As shown above, the fish 19 to be discriminated are put on the bucket 12 of the bucket conveyor 13 either head first or tail first through the automatic supply unit 11, light is illuminated onto the genital gland area 19a of the fish 19 to the light sensor unit 14, and the sex of the fish 19 is determined by the waveform memory data $D_1$ of the fishes 19, for example so that the male fish are discharged out of the fish 19 based on the discrimination data $D_2$, and the male and female fish are thus separated.

In this method, in comparison with the conventional manual operation of fish supply or spot information in the male and female determination, since the fish 19 can be automatically supplied, complete automation in the discrimination and separation and the rationalization of the discrimination processes are possible.

FIG. 8 to FIG. 11 are diagrams for explaining in more detail the above-mentioned discrimination control unit 15.

The waveform memory 152 comprises a waveform memory device 152-2, A/D converter 152-1, and an arrival signal detector 152-3. The amplifier 153 comprises a reference signal oscillator 153-0, a transmission signal amplifier 153-1, and a synchronizing detector 153-2, the distinction extraction and discrimination unit 154 comprises a control unit 154-0, an object domain extraction unit 154-1, mean distinction extraction unit 154-2, sex discrimination unit 154-3, and a fish extent detection unit 154-4. The discharge drive unit 155 comprises a discharge drive unit 155-1 and a discharge driver 155-2.

The transmission signal amplifier 153-1 converts the light transmission signal to an electrical signal by a photo signal to electrical signal converter and amplifies the converted signal.

The synchronizing detector 153-2 modulates the light signal in the laser drive unit. The synchronizing detection is carried out between a modulated light transmission signal and the modulated light signal. By this synchronizing detection, a noiseless light signal can be detected.

In the A/D converter 152-1, the light transmission signal is converted to a digital signal so that the control unit can process the signal in a digital circuit.

The waveform memory device stores the light transmission signal in real time.

The signal $S_1$ (light transmission signal) is supplied to the transmission signal amplifier 153-1, the signal $S_2$ (drive control signal) is output from the discharge driven 155-2, the reference signal C for the synchronizing detection is output from the light projection power source 151. The signal $S_3$ (arrival signal) is supplied to the object domain extraction unit 154-1 and the control unit 154-0 through the arrival signal detector 152-3, and the signal $S_4$ (photoelectric switch signal) is supplied to the control unit 154-0 through the fish extent detection unit 154-4. The control unit 154-0 controls the above components.

Figure 9:
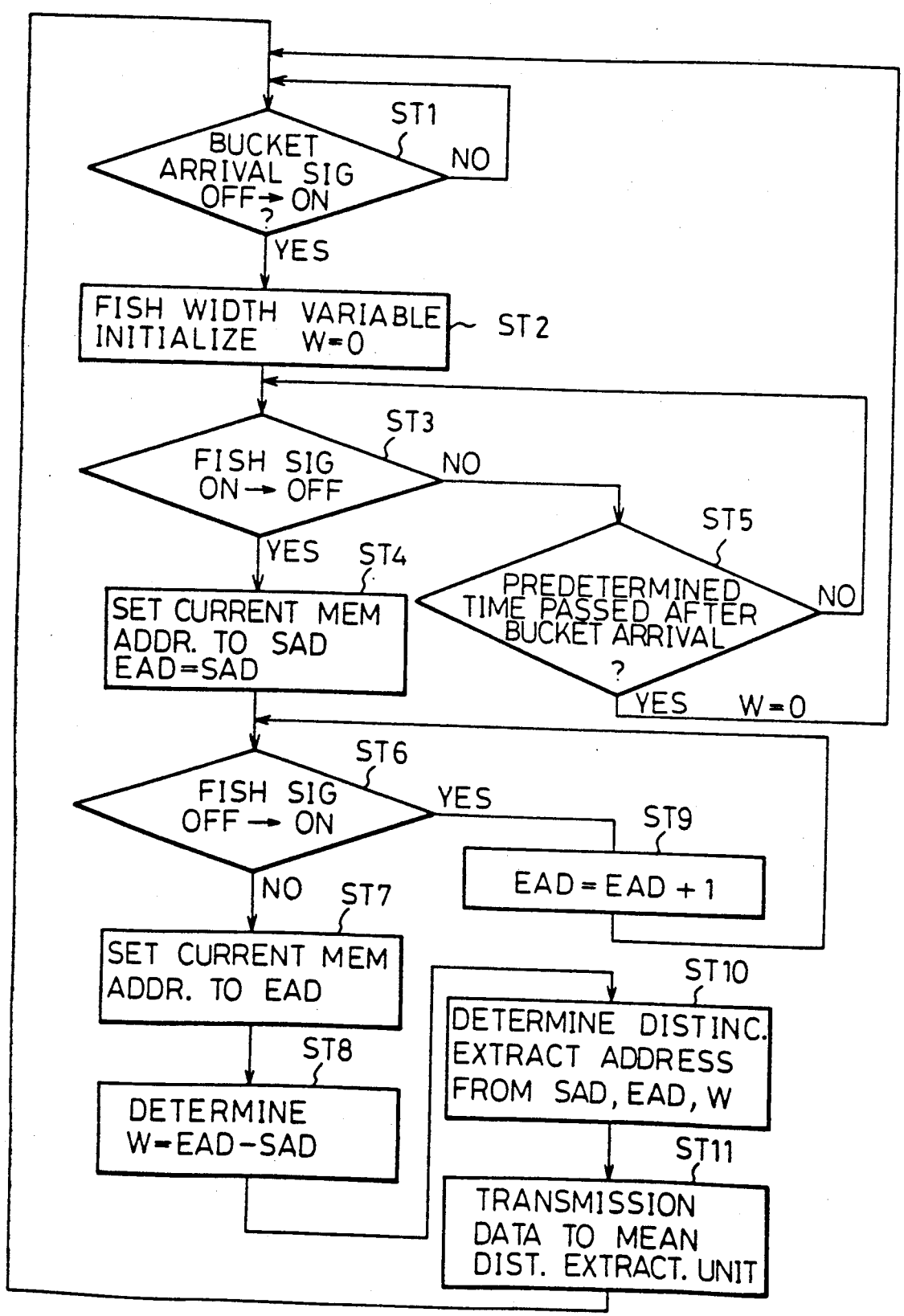
FIG. 9 is a flowchart showing processes in the unit of FIG. 8.

FIG. 9 shows processes in the object domain extraction unit 154-1. In ST1 (step 1), if the signal $S_3$ is "ON", the process advances to ST2, if the signal $S_3$ is "OFF", the process repeats the ST1. In the ST2, a fish width variable is initialized (i.e., fish width W =0). In ST3, when signal $S_4$ changes to "OFF" from "ON", the process advances to ST4, and when the signal $S_4$ remains "ON", the process advances to ST5. In the ST5, when a predetermined time has passed after the signal $S_3$ becomes "ON", the bucket is determined to be empty, W is set to "0" and the process returns to the ST1. If the predetermined time has not passed, the process returns to the ST3. In the ST4, the current address of the waveform memory is set with the start address (SAD). End address (EAD) is also set with the SAD. Then, the process advances to ST6, if the signal $S_4$ is "ON", during the "ON" time, a predetermined value is added to the EAD in each constant period (ST9). When the signal $S_4$ is "OFF", the current waveform memory address is set with the EAD value (ST7). In ST8, it is determined that W=EAD−SAD. In ST10, the address of the distinction extraction portion is determined from the data of the SAD, EAD, and W. Then, in ST11, each block of data is transferred to the mean distinction extraction unit 154-2.

Figure 10:
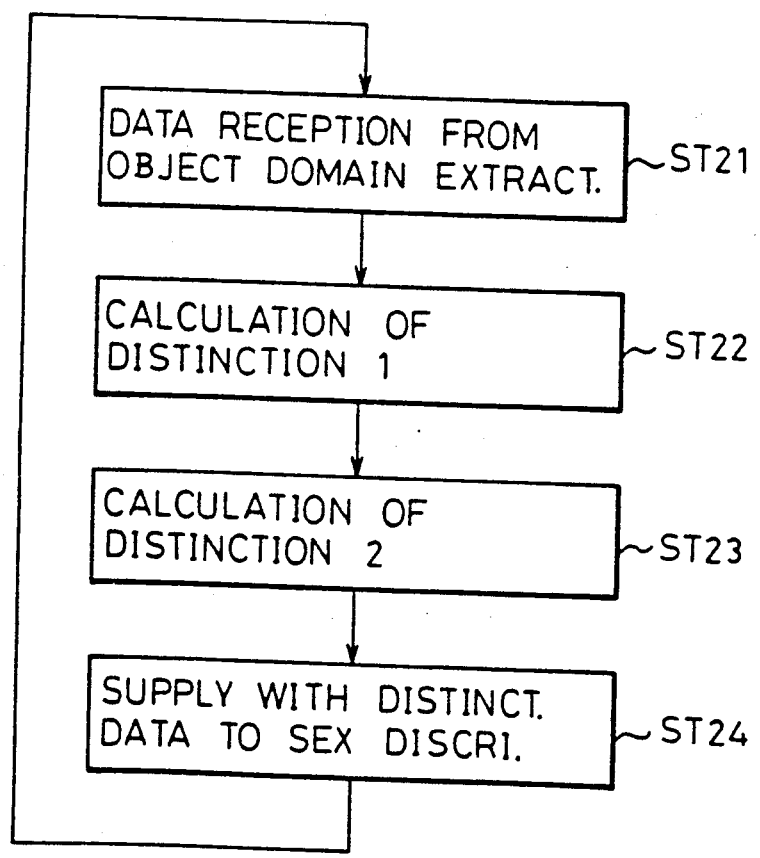
FIG. 10 is a flowchart showing processes in a mean distinction extracting unit in FIG. 8.

In FIG. 10, processes of the mean distinction extraction unit 154-2 are shown. The data transferred in the process of ST11 in FIG. 9 is first received (ST21), a distinction 1 is calculated in ST22, and a distinction 2 is calculated in ST23. The distinction 1 is a mean value of a value stored in the waveform memory corresponding to from 10 mm to 20 mm in one end of the object domain and the distinction 2 is a mean value of a value stored of the waveform memory corresponding to from 10 mm to 20 mm in another end of the object domain. In ST24, distinction data is supplied to the sex discrimination unit 154-3.

Figure 11:
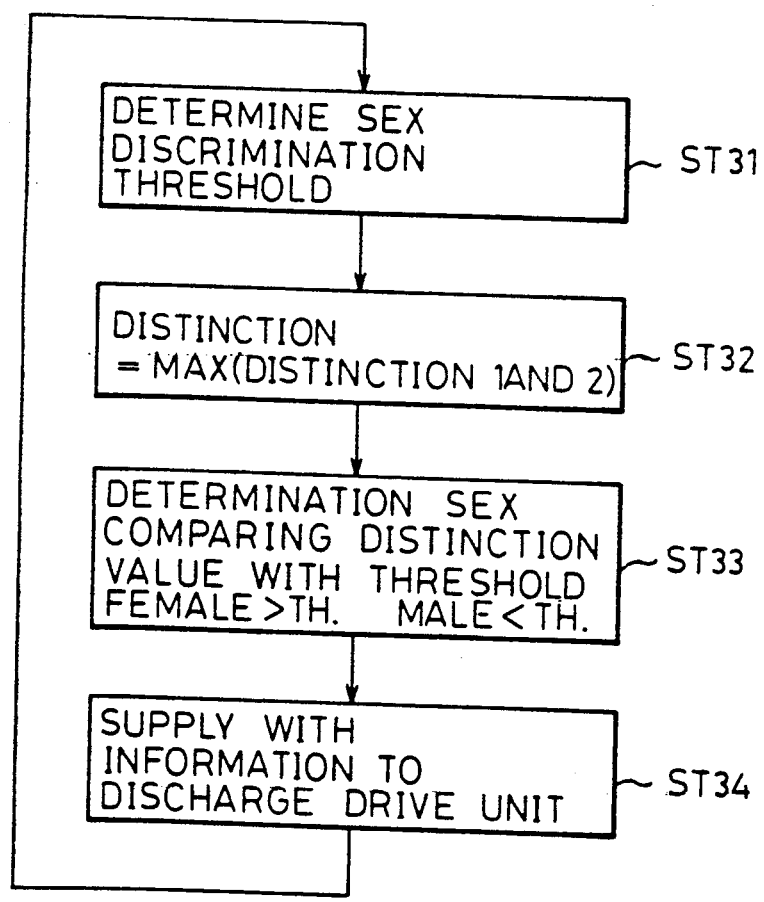
FIG. 11 is a flowchart showing processes in the sex discrimination unit in FIG. 8.

FIG. 11 shows processes in the sex discrimination unit 154-3. In ST31, the threshold value of the sex discrimination is determined from the fish width data. That is, in a fish having a large width, since the thickness of the fish is large, the threshold value is small. In ST32, for the distinction value the larger value of the distinction 1 and the distinction 2 is selected and in ST33, the distinction value is compared with the threshold value and then the sex of the fish is determined. If the distinction value is larger than the threshold value, the fish having that distinction value is determined to be female, and if the distinction value is smaller than the threshold value, the fish is determined to be male. In ST34, sex discrimination information is supplied to the discharge drive unit 155-1.

Figure 12:
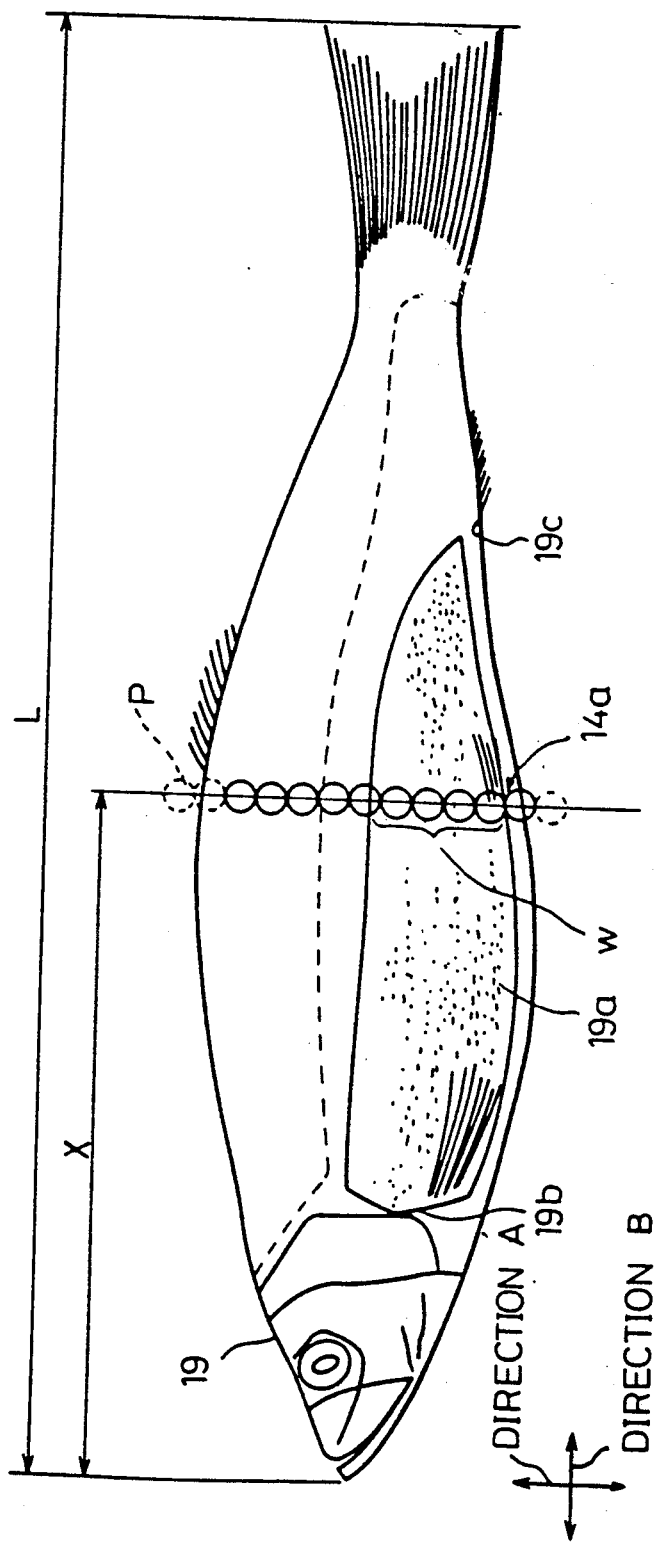
FIG. 12 is a side view of a fish for explaining a fish discrimination method according to embodiments of the present invention.

FIG. 12 is an explanatory diagram for explaining the discrimination of the fish to be discriminated according to the first embodiment of the present invention.

In the figure, the fish 19 is, for example, a herring, a cod or the like to be discriminated as to whether it is male or female. The roe removed from the female herring is called Kazunoko, and the roe removed from the female cod in called Tarako.

The portion shown by reference numeral 19a is the genital gland area which is located between a pectoral fin 19b and an anus 19c in a grown fish 19 to be discriminated, having a width W of fish roe and a length of L. Accordingly, an aperture of the light transmission slit 121 in the bucket 12 must be provided so that a light spot 14a scans a point P (light illuminating point), which is at a constant distance X from the head, e.g., $X = L/2$. In the discrimination control unit 15, when the transmission light quantity is analyzed using the area on a graph of the relationship between the light transmission quantity and scanning position assuming that, for example, the length of the fish is approximately $L = 30$ cm, the waveform data is not appropriate at the portion having a thickness of 5 mm. Therefore, the mean values of light transmission quantity I at the portions between 10 to 20 mm from both ends in the direction A from belly to back are calculated, and the larger value of the two mean values is a distinction value for a female fish.

Figure 13:
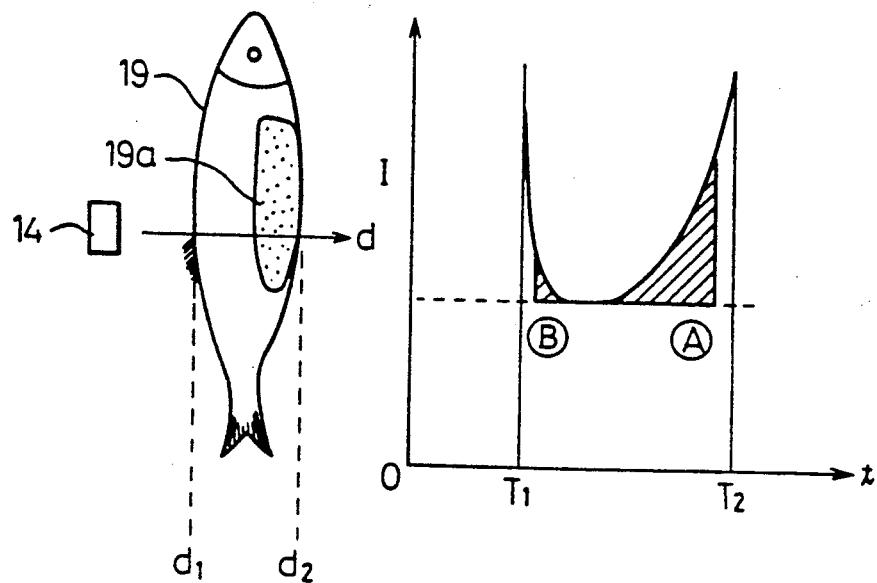
FIG. 13, FIG. 14, FIG. 15 and FIG. 16 are light transmission waveform diagrams utilized in the fish sex discrimination in the equipment of FIG. 6.
Figure 14:
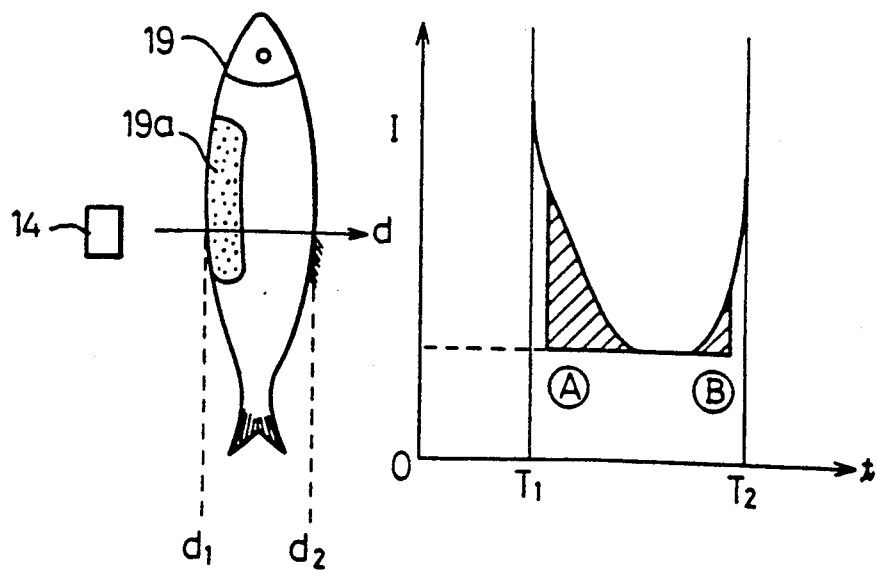

FIG. 13 and FIG. 14 show explanatory diagrams for explaining light transmission waveform processing when sex discrimination is carried out according to the first embodiment of the present invention. FIG. 13 shows the female fish scanned from the back and detected by the light sensor 14, and a graph expressing the relationship between the light transmission quantity I and scanning position.

In FIG. 13, $d$ is the scanning speed of an illuminated light 14a from the light projection unit 141 of the light sensor 14 corresponding to the moving speed of the bucket conveyor 13. Also, $d_1$ is a position crossing the photoelectric switch and the photoelectric switch 143 and 144 is "ON" at the back side of the fish. Similarly, $d_2$ is a position at which the photoelectric switch becomes "OFF". The fish extent is determined between the positions $d_1$ and $d_2$ and the light transmission signal $S_1$ is output from the light sensor 14.

In the above graph, the ordinate shows the light transmission quantity I and the abscissa shows the time t. The time t corresponds to the scanning position. $T_1$ is a cutout time of the photoelectric switch 143 and 144 and $T_2$ is an "ON" time of the photoelectric switch 143 and 144. The photoelectric switch 143 and 144 is "OFF" during the time that the fish 19 intercepts the same.

In the graph the encircled A mark shows a light transmission domain of the female genital gland area 19a, i.e., the domain in which the roe exists. The encircled B shows a light transmission domain of a female fish back muscle. Accordingly, the sex discrimination is possible by the distinction of the difference between the areas of the encircled A and B which is large thus showing female fish roe.

FIG. 14 shows the female fish scanned from the belly and detected by the light sensor 14, and a graph expressing a relationship between the light transmission quantity I and the scanning position. The others are the same as in FIG. 13.

In the graph of FIG. 14, opposite area distribution is obtained by comparing with that of FIG. 13. From the graph, the fish scanned from the belly can be discriminated as to sex.

Figure 15:
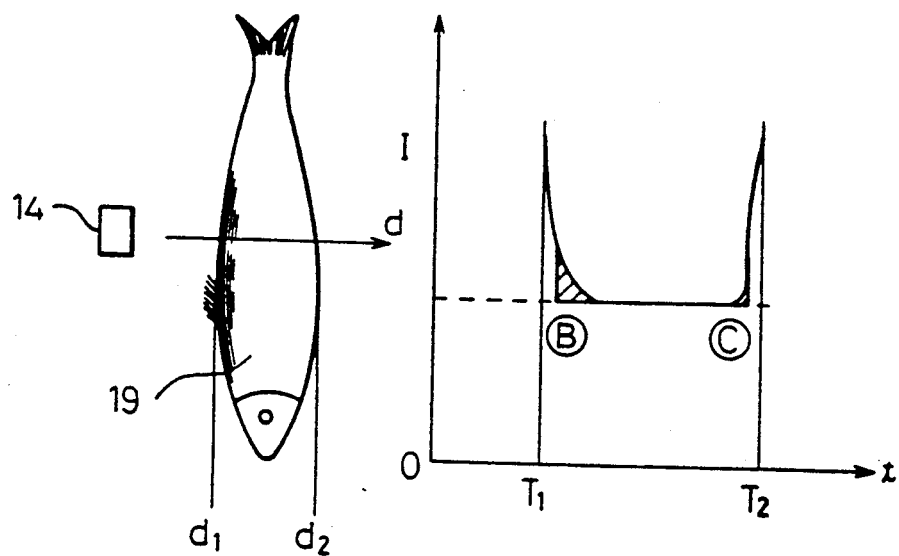
Figure 16:
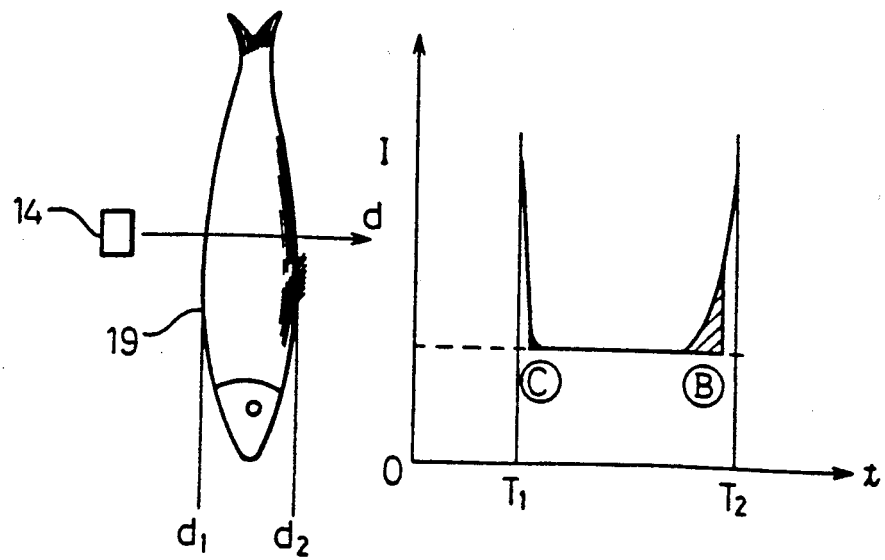

FIG. 15 and FIG. 16 are explanatory diagrams for explaining light transmission waveform process in the discrimination of the male fish according to the first embodiment of the invention. FIG. 15 shows the male fish scanned from back and detected by the light sensor 14, and a graph expressing the relationship between the light transmission quantity I and the scanning position. The reference mark or numerals shown in FIGS. 15 and 16 have the same functions as those in FIG. 13 and thus the explanations thereof are abbreviated. In FIGS. 15 and 16, the head and tail of the fish are reversed from the light sensor 14 unlike FIG. 13.

In the graphs, the encircled C shows the light transmission quantity I obtained from the belly muscle, e.g., in FIG. 12, assuming a herring having a length of approximately $L = 30$ cm, 5 mm from the one end.

As shown in FIGS. 15 and 16, the male fish has no light transmission domain (encircled A) in which fish roe exists so that the discrimination of the fish sex can be carried out.

FIG. 16 shows the male fish scanned from the belly and detected by the light sensor 14 and a graph expressing the relationship between the light transmission quantity I and the scanning position.

In the graph 16, opposite area distribution is obtained by comparing with that of FIG. 15. From the graph, the fish scanned from the belly can be discriminated as to sex.

Figure 17:
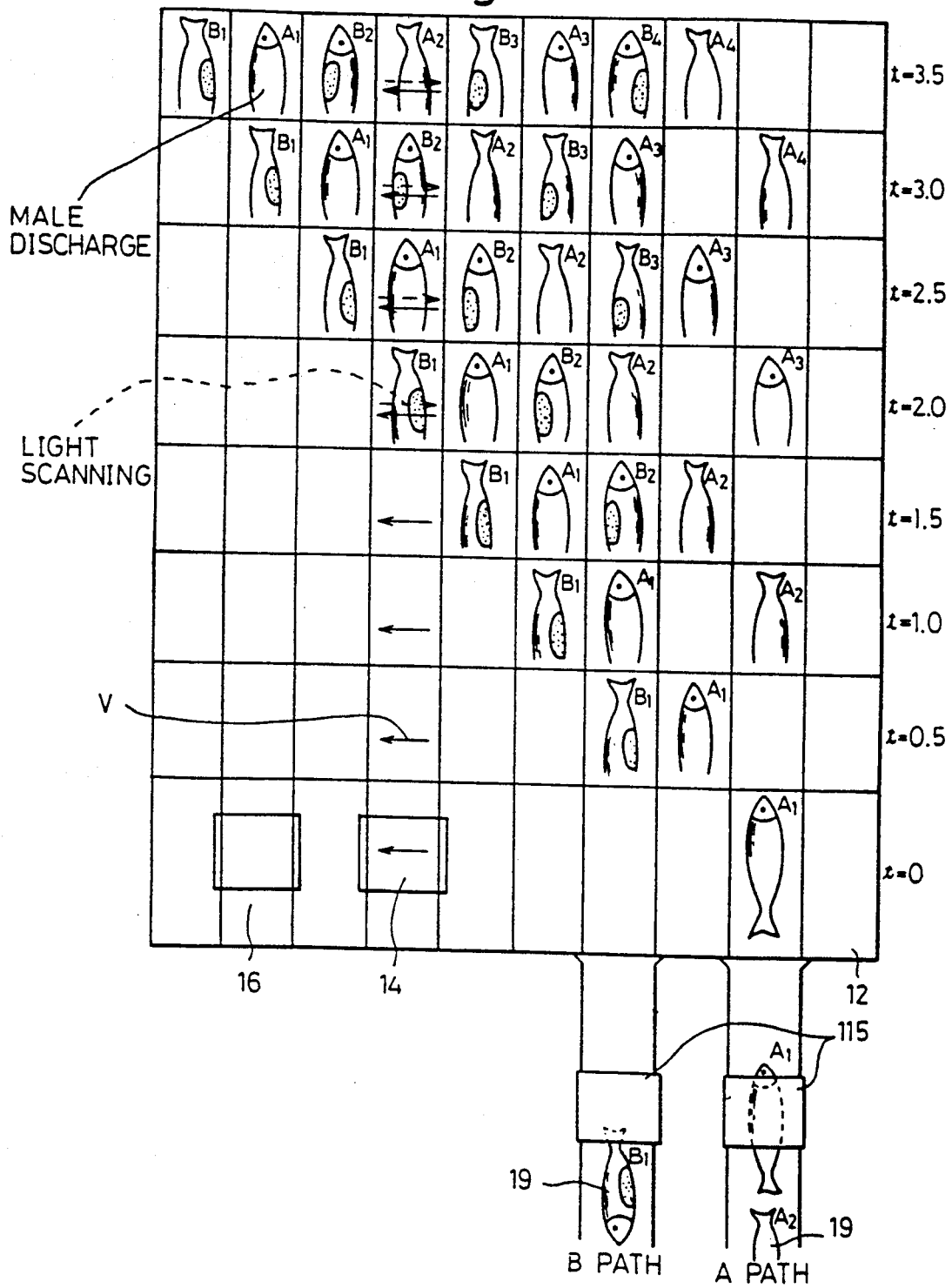
FIG. 17 is an explanatory diagram showing an automatic fish supply apparatus in the embodiment of FIG. 6.

FIG. 17 is an explanatory diagram for explaining the operation time in the automatic supply unit according to the first embodiment of the present invention and shows the supply time of the fish to the bucket 12 and a typical diagram showing the change over a period of time.

In FIG. 17, the fish 19, for example, are sent out at intervals of 0.5 sec from the A path and B path of the separation and supply portion 115.

Assuming that the time needed for sending is $t_0$, the fish $A_1$ in the A path when $t = -t_0$ is sent out on the bucket 12 moving synchronized with the fish sending period at $t = 0$. The A path and B path are provided apart at a distance of the width of one bucket 12.

When $t = 0.5$, the fish $B_1$ in the B path is sent out to the bucket 12. Then, when $t = 1.0$, the fish $A_2$ in the A path is sent out. Thus, sequentially the fishes are automatically put on the bucket 12.

Further, when $t = 2.0$, the fish $B_1$ is scanned by the light spot 14a in the light sensor 14, and after that, e.g., the fish $B_1$ is discriminated as a female. When $t = 2.5$, the fish $A_1$ is scanned by the light spot 14a in the light sensor 14, and after that, e.g., the fish $A_1$ is discriminated as a male. As a result, when $t = 3.5$, the male is discharged through the discharge unit 16, and the female fish is supplied to the female carrying conveyor.

Figure 18:
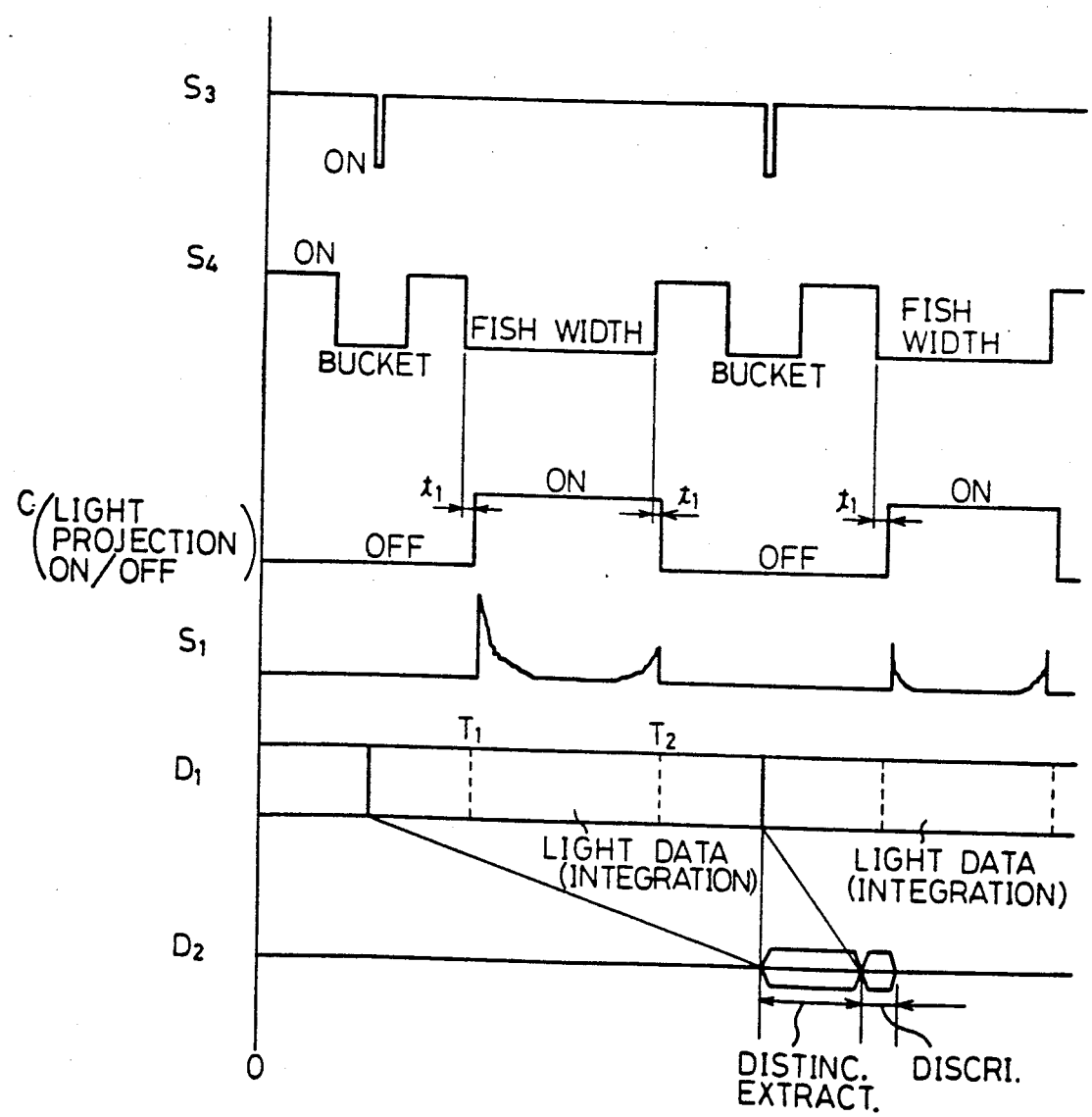
FIG. 18 is a process chart relating to time lapse in the equipment of FIG. 6.

Thus, the fish 19 can be processed to discriminate fish sex at a speed of 120 fish/minute. FIG. 18 is an operation time-chart in the fish sex discrimination method according to the first embodiment of the present invention. In the figure, the signal $S_3$ is an arrival signal showing a bucket supplying time, and is obtained by the contact of the proximity switch 145 and an arrival sensing plate 123. The signal $S_4$ is a photoelectric switch signal showing a fish extent and is generated when the bucket 12 or the fish 19 through the light transmission slit 121 passes between the photoelectric switch 143 and 144.

A signal C corresponds to "ON" and "OFF" of the light projection power source 151. The signal C rises after a time $t_1$ from the fall of the photoelectric switch signal $S_4$ (i.e., a fish back or belly crosses the switch) and supplies power to the light projection unit 141 or cuts off power after $t_1$ from the rise of the fish width signal.

The signal $S_1$ is a light transmission signal and is converted to an electrical signal from the transmitted light emitted from the fish.

$D_1$ is a waveform memory data, and shows a light transmission quantity data between times $T_1$ and $T_2$. The time $T_1$ is delayed by $t_1$ from the fish width signal and the time $T_2$ is an "OFF" time of the light projection power source 151. $D_2$ is a discrimination data, which is extracted after one period of the movement of the bucket 12 and is used to determine whether the fish is male or female. The discrimination data $D_2$ becomes the drive control signal $S_2$ through the discharge drive unit 155.

A fish sex discrimination method according to the first embodiment is explained below.

First, the fish 19 are automatically supplied at the bucket moving period of the arrival signal $S_3$, then, the fish existing extent is confirmed by the photoelectric switch signal $S_4$, and simultaneously, the light projection power source is made to be "ON" and the light is transmitted to the genital gland area 19a of the fish 19 scanning in the direction from belly to back.

Then, the large light transmission data expressed by the area on a graph, discussed earlier, is extracted as distinction data from the light transmission signal $S_1$ (light transmission data), the fish 19 is discriminated as a female, and, based on the discrimination data $D_2$, for example, the male fish is discharged.

As mentioned above, the fish 19 to be discriminated, which is a fully grown fish, has a wide genital gland area behind the pectoral fin 19b and before the anus 19c. Thus, the genital gland area 19a always exists at a constant distance X from the head or tail of the fish. Since the difference of the light transmission quantity between the female roe and male milt is large, and although in the back muscle portion of the female or the male, only a small amount of light is transmitted since the light transmission degree through muscle is smaller than that of roe, the mean values of the light transmission quantity I in the effective portions, e.g., from 10 mm to 20 mm with reference to both ends of the fish, are calculated, and the larger one of the two mean values is extracted as a distinction quantity. As a result, if the direction B (head to tail) of the fish is not aligned and the light spot scans the fish from the back side or the belly side, the sex discrimination can be performed by the evaluation of the area on a graph, discussed earlier, of the waveform memory data $D_1$. By using this discrimination data $D_2$, the fish are discharged according to sex, and high accuracy sex determination is possible.

A second embodiment of the present invention is explained next with reference to FIG. 19.

Figure 19:
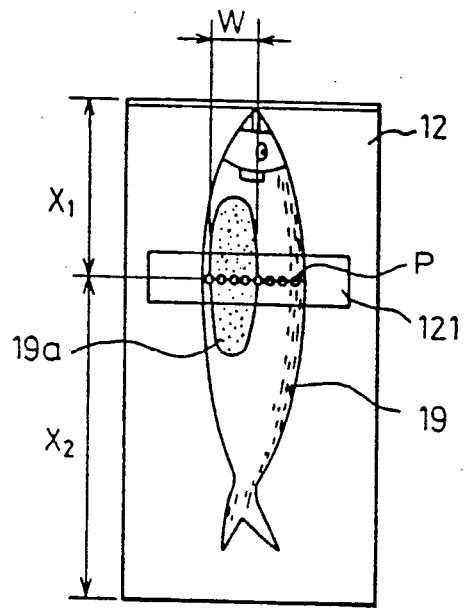
FIG. 19 is an explanatory diagram showing a fish sex discrimination method according to a second embodiment of the present invention.

In FIG. 19, unlike the first embodiment, the fish 19 are put on the bucket 12 aligned at the head by providing a head-first supply mechanism in the automatic supply unit.

Further, the light transmission slit 121 is provided at a distance of $\frac{1}{2}$L assuming that the fish length is L in the first embodiment, however, in the second embodiment, as shown in FIG. 19, the distance from the head to the position of the light illumination is $x_1$ and the distance from the position of the light illumination to the tail is $x_2$ and $x_1 < x_2$. In this way, the slit is provided at the position having the widest roe width in the genital gland area of the fish.

By using the second embodiment, the fish 19 is supplied to the bucket 12 aligned either head first or tail first. Thus, the light 14a can always illuminate the genital gland area 19a at a constant distance from the head of all the fish 19, and more stability and greater sex discrimination accuracy can be obtained compared with the first embodiment.

Other parts of this embodiment are similar to the first embodiment.

Figure 20A:
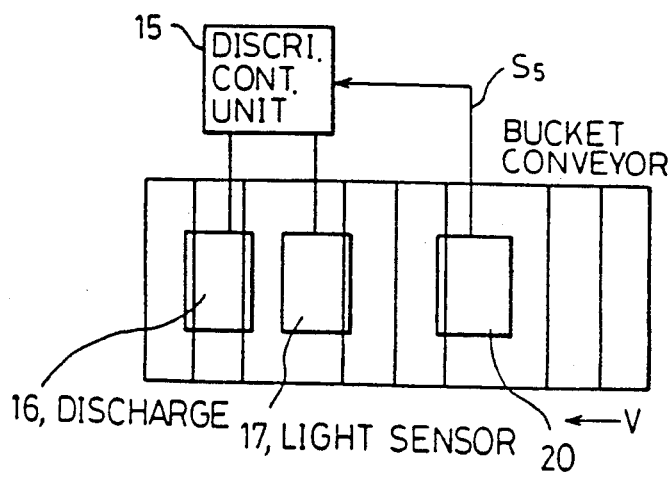
FIGS. 20A and 20B respectively comprise is an explanatory diagram of a system for performing a fish sex discrimination method according to a third embodiment of the present invention and a discrimination unit employed in the system of FIG. 20A.
Figure 20B:
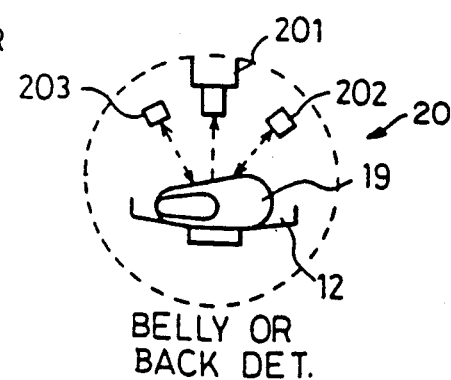

FIGS. 20A and 20B respectively comprise an explanatory diagram of a system for performing a fish sex discrimination method according to a third embodiment of the present invention and a discrimination unit employed in the system of FIG. 20A.

Unlike the first and second embodiments, in the third embodiment, a belly and back discrimination unit 20 is provided, to which the discrimination control unit 15 supplies the light transmission signal $S_1$ and a belly and back discrimination signal $S_5$, and the light transmission quantity is discriminated with reference to the signal $S_5$.

The belly and back discrimination unit 20 comprises a CCD (photoelectronic pick up device) 201 and a light projector 202 and 203, and the belly or back is determined by a difference in the amount of black and white which are obtained by the black of the fish back and the white of the fish belly.

As a result, the light transmission signal $S_1$ can recognize whether the back or belly has been detected in the discrimination control unit 15 based on the belly and back discrimination signal $S_5$ from the belly and back discrimination unit 20.

By using the above unit, when the light transmission quantity I of the light transmission signal $S_1$ is evaluated using the area encircled by the curve of quantity I, the light transmission quantity I of the female genital gland area 19a or the female back muscle portion, or the light transmission quantity I of the male belly milt area or the male back muscle portion can be discriminated accurately. Therefore, even if the fish has a narrow genital gland area 19a, erroneous discrimination of the fish sex can be reduced as much as possible, and the discrimination accuracy rate can be increased.

By using these embodiments, compared with the conventional manual fish supply method or sex discrimination using spot information, fish are automatically supplied, and then, complete automation of the discrimination and separation processes can be carried out.

Also, by using the automatic supply unit 11, the fish 19 are arranged head first or tail first by the arranging portion in the direction of head to tail 113, so that the fish 19, for example, can be supplied one by one into the bucket 12 from the separation and supply portion 115 synchronized with the moving speed of the bucket conveyor 13.

Thus, manual labor is not necessary and automatic operation is realized. Further, in the discrimination control unit 15, the light transmission signal $S_1$ obtained from the light projection and reception unit 14 is stored in the waveform memory 152 as the light transmission quantity I scanned in the direction A, and the stored signal is analyzed in the distinction extraction and discrimination unit 154 by evaluating an area encircled by the graphically expressed quantity I, if the quantity I is large, the fish is female, and if the quantity I is small, it is male. By this determination, the drive control signal $S_2$ can be output to control the discharge unit 16. Compared with the conventional light spot method utilizing spot information, discrimination by using the scanning information (line information) of the signal $S_1$ is obtained based on the light transmission quantity I and a high accuracy discrimination carried out.

In addition, putting the fish 19 on the bucket 12, the light 14a illuminated from the light projection unit 141 in the light projection and reception detection unit 14 is supplied to the fish 19 through the elongated slit 121 in the bucket 12 during the movement of the bucket conveyor 13, and then arrives at the reception unit 142. The fish 19 is then positioned automatically in relation to the light projection and reception detection unit 14 and the signal $S_1$ becomes the line information depending on the width of the slit 121.

According to the first embodiment, since the grown fish to be discriminated has a wide genital gland area 19a from the pectoral fin 19b to the anus 19c, the area always exists at a constant distance X from the head or tail of the fish 19, and the light transmission quantities for the female roe and the male milt are quite different from each other. Moreover, even though the back side muscle portion transmits little light, the transmission rate is even less than that of the roe. Accordingly, the light illuminates the fish by scanning the light in direction A, the mean value of the light transmission quantities I in the domains from 10 mm to 20 mm with reference to both ends of the fish are calculated, and the larger value of the two quantities is extracted as a distinction value. By the above processing, even if the fish are supplied to the hopper not arranged in direction B and supplied to the light projection and reception detection unit 14 with the back side first or the belly side first, the sex determination of the fish is possible by the calculation of the area on a graph of the scanning position and the light transmission quantity I. Based on this discrimination data, fish having the same sex are discharged and high accuracy sex discrimination is carried out.

In the second embodiment, the fish 19 are supplied to the bucket 12 in one direction of head first or tail first. Thus, since the genital gland area 19a being at a constant distance X from the head of the fish can be always illuminated with the light 14a, compared with the first embodiment, the discrimination accuracy increases and becomes more stable.

In the third embodiment, the light transmission signal $S_1$ can detect the back side or the belly side in the discrimination control unit 15 by the belly and back discrimination signal $S_5$.

By the signal $S_5$, in the case of processing the area on a graph of the light transmission quantity I obtained from the light transmission signal $S_1$, it can be accurately discriminated whether the quantity I data reflects the female genital gland area 19a or the back side muscle portion, or the male belly side milt area or the male back side muscle portion, and then, even if the fish do not have a wide genital gland area, the errors in discrimination can be considerably reduced.

We claim:

1. Fish sex discrimination equipment comprising:
   an automatic supplying unit for separating and supplying fish to be discriminated,
   buckets on which the fish are put,
   a bucket conveyor for carrying the buckets,
   a light projection and reception detection means for projecting light onto a genital gland area of the fish and for detecting transmission light from the fish, the transmission light being scanned in a direction from belly to back or from back to belly in the fish by the movement of the bucket,
   a discrimination control means for discriminating whether the fish are male or female based on data of the detected transmission light,
   a discharge means for discharging the discriminated fish having the same sex, and
   a first conveyor means and a second conveyor means for carrying the discriminated and separated male and female fish, respectively,
   wherein the fish to be discriminated are automatically supplied and the sex of the fish is discriminated and the fish are separated.

2. Fish sex discrimination equipment as set forth in claim 1, wherein said automatic supplying unit comprises at least an arranging portion for arranging the fish in a direction from head to tail to be discriminated in a direction from head to tail, and a separation and supply portion having two paths for alternately supplying the fish, and
   the fish are separated one by one on the bucket and automatically supplied.

3. Fish sex discrimination equipment as set forth in claim 1, wherein said discrimination control means comprises at last a waveform memory, a distinction extraction and discrimination unit, and a discharge drive unit,
   the detected transmission light is converted to electrical data, the electrical data is stored in the waveform memory, the discrimination of the fish sex is carried out using the memorized data through the distinction extraction and discrimination unit, the discharge drive unit outputs a drive control signal based on the discriminated result, and the fish having the same sex are discharged after receipt of the drive control signal.

4. Fish sex discrimination equipment as set forth in claim 1, wherein said bucket comprises an elongated light transmission slit in the direction of motion of the bucket conveyor, and the light transmits into the fish and scans continuously in the direction of the belly to back of the fish.

5. Fish sex discrimination equipment as set forth in claim 3, wherein the memorized data are processed to obtain a mean value over an effective width of the genital gland area.

6. Fish sex discrimination equipment as set forth in claim 3, wherein the memorized data are processed to integrate the data of the detected transmission light relating to a position in the genital gland area.

7. A fish sex discrimination method comprising steps of:
   automatically supplying fish to be discriminated, transmitting light to a genital gland area of the fish,
scanning the light in a direction from belly to back or back to belly by movement of a bucket conveyor,
discriminating the fish as male or female based on the quantity of light transmitted through the genital gland area of the fish, and
discharging the male fish through a first conveyor means, and the female fish through a second conveyor means.

8. A fish sex discrimination method as set forth in claim 7, wherein the automatic supplying step includes a supply of fish aligned head first or tail first to a bucket through an automatic supply unit.

9. A fish sex discrimination method as set forth in claim 7, further comprising a step of determining based on the transmission light whether the transmission light is obtained from the belly portion or from the back portion determined by a white or black surface color of the fish.

10. A fish sex discrimination method as set forth in claim 7, wherein the discriminating step comprises a calculating process to obtain a mean value of data based on the quantity of the transmitted light, and a comparing process to compare the mean value with a predetermined threshold value.

11. A fish sex discrimination method as set forth in claim 7, wherein the discriminating step comprises are integrating process to obtain an integrated data value based on the quantity of light transmitted, and a comparing process to compare the integrated value with a predetermined threshold value.

* * * * *

UNITED STATES PATENT AND TRADEMARK OFFICE
CERTIFICATE OF CORRECTION

PATENT NO. : 5,013,906
DATED : May 7, 1991
INVENTOR(S) : MIYAKAWA et al.

It is certified that error appears in the above-identified patent and that said Letters Patent is hereby corrected as shown below:

Col. 4,    line 17, delete "is".

Col. 5,    line 5, change "$f$" to --1$f$--.

Col. 6,    line 62, after "Å" delete "A".

Col. 10,    line 68, after "fish/minute." start a new paragraph with "FIG. 18".

* Col. 16,    line 11, change "are" to --an--.

Signed and Sealed this

Twenty-ninth Day of June, 1993

Attest:

MICHAEL K. KIRK

*Attesting Officer*      *Acting Commissioner of Patents and Trademarks*